United States Patent [19]
Resch et al.

[11] 3,885,766
[45] May 27, 1975

[54] MODULAR SEATING ASSEMBLY

[75] Inventors: Richard J. Resch; Robert J. Bomber, both of Green Bay, Wis.

[73] Assignee: Krueger Metal Products, Incorporated, Green Bay, Wis.

[22] Filed: Dec. 26, 1973

[21] Appl. No.: 427,620

[52] U.S. Cl............. 248/188.1; 248/74 R; 297/232
[51] Int. Cl........................................... F16m 11/20
[58] Field of Search ..... 248/188.1, 228, 74, DIG. 6, 248/68; 297/232, 118; 108/88, 150; 403/384, 403/404, 405, 408

[56] References Cited
UNITED STATES PATENTS

| | | | |
|---|---|---|---|
| 2,418,539 | 4/1947 | Anderson | 248/74 R |
| 2,425,033 | 8/1947 | Fletcher | 248/74 R |
| 3,087,206 | 4/1963 | Delf et al. | 248/DIG. 6 |
| 3,568,967 | 3/1971 | Furtak | 248/188.1 |
| 3,762,765 | 10/1973 | Piretti | 297/232 X |

FOREIGN PATENTS OR APPLICATIONS

| | | | |
|---|---|---|---|
| 221,618 | 6/1962 | Austria | 248/74 PB |
| 335,221 | 9/1930 | United Kingdom | 248/68 CB |

Primary Examiner—Roy D. Frazier
Assistant Examiner—Peter A. Aschenbrenner
Attorney, Agent, or Firm—Henry C. Fuller

[57] ABSTRACT

A modular furniture assembly includes clamps which are used to secure seats or tables at any point on a horizontal supporting beam. The clamps are also employed to secure two spaced horizontal beams together to secure the adjacent ends of two beams in unified assembly or to connect ganging bars to two parallel spaced horizontal beams. The clamps include a clamping plate and a channel member. The channel members have four threaded bosses which are arranged around the inside of the channel and have inwardly converging surfaces to receive the beam in a press fit within the bosses. The clamping plate is provided with apertures for receiving bolts which are threaded into the bosses to securely clamp furniture elements such as seats or table tops to the beams at any location along the beams. Thus the seats, legs and table tops can be arranged at any desired location on the horizontal beams without the need for a plurality of predrilled holes in the beams which would limit the possible arrangements and positions of the furniture elements on the beam.

9 Claims, 6 Drawing Figures

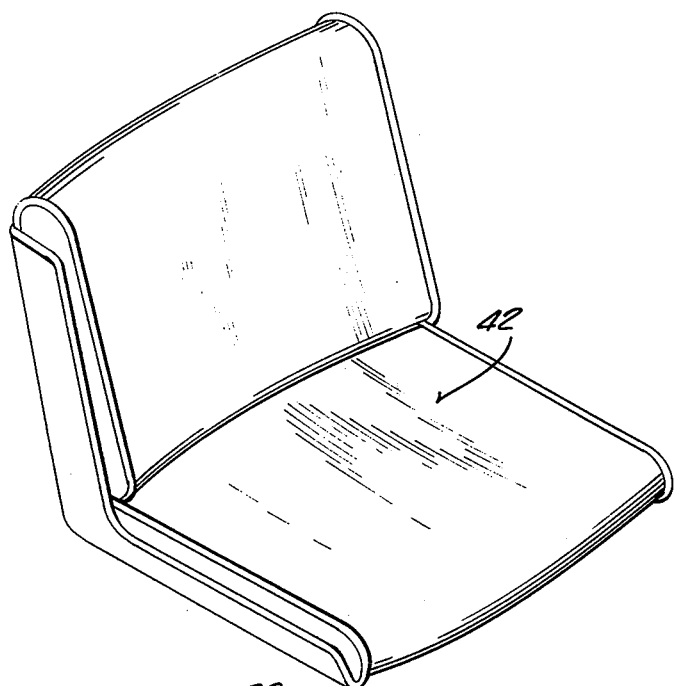
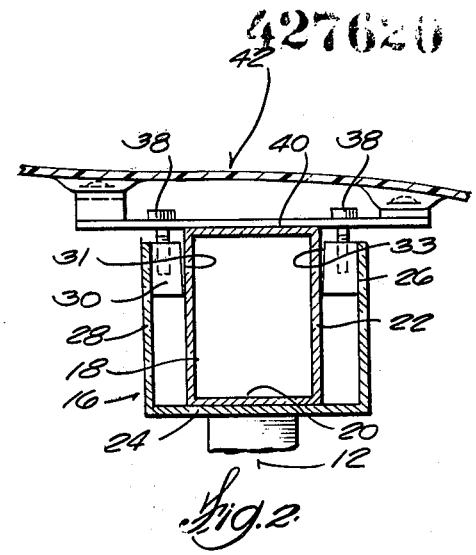
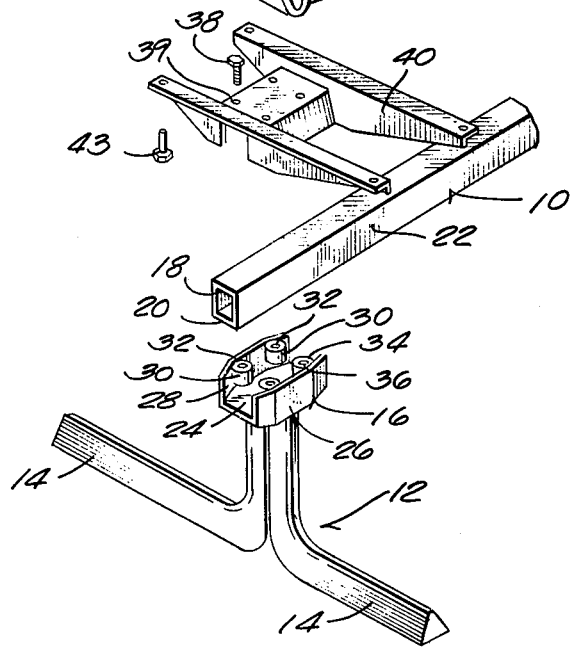

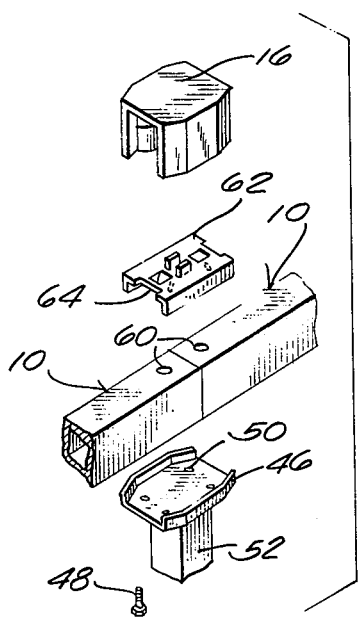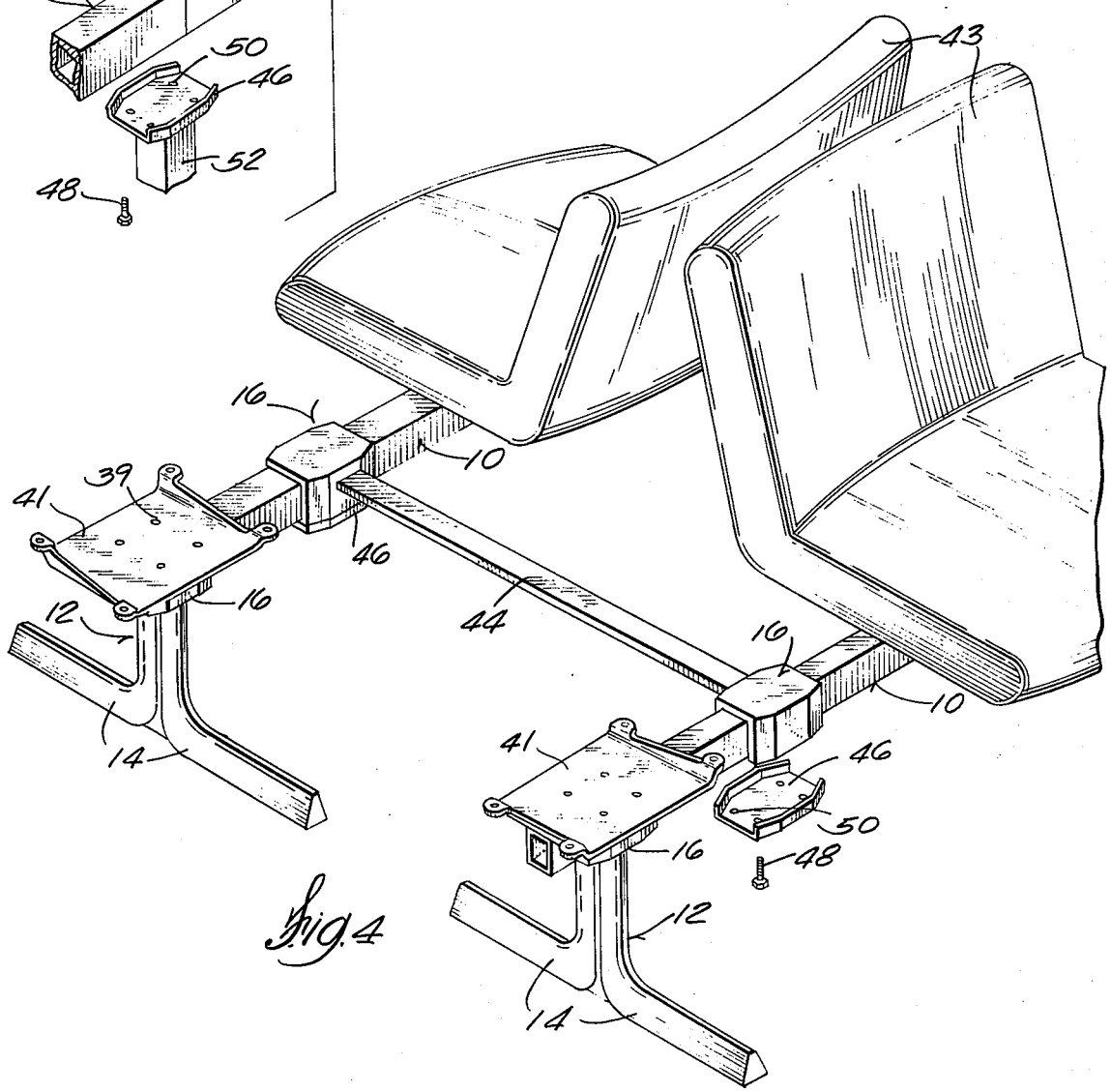

MODULAR SEATING ASSEMBLY

BACKGROUND OF THE INVENTION

A typical prior art furniture support is shown in U.S. Pat. No. 3,568,967 which was issued to R. T. Furtak on Mar. 9, 1971 for a "Modular Furniture Base." This patent disclose a furniture supporting beam 10 which has holes drilled therein for receiving bolts which clamp the beam to supporting bases and which also clamp seats to the beam. However, these holes weaken the beam at the points of maximum stress, i.e. below the seats. Also, the holes require the furniture to be located at certain fixed locations along the beam. Accordingly, the principal object of this invention is to provide a modular furniture support which does not require holes in the supporting beam underneath the furniture items. Other objects and advantages of the invention will be apparent to those skilled in the art from the description which follows.

SUMMARY OF THE INVENTION

A furniture supporting beam is supported by at least two base members each having a lower foot portion for supporting the base and an upper yoke portion or clamp for supporting the beam. Each clamp includes a channel member shaped to embrace the front and rear faces of the beam, and each channel includes threaded apertures in four spaced bosses. Machine screws extend downwardly into the threaded openings through a clamping plate to secure the clamps to the beam and to secure furniture items to the beam above the clamps. Oppositely located bosses have converging surfaces which engage the beam in a press fit. A transverse ganging bar may extend between two clamps for clamping two beams together to mount rows of chairs in back-to-back relationship with each other. Because no apertures are in the beam, the furniture elements can be arranged at any appropriate position on the beam.

DESCRIPTION OF THE DRAWINGS

FIG. 1 is an exploded fragmentary perspective view of a furniture assembly employing a clamp in accordance with the invention.

FIG. 2 is an enlarged, fragmentary cross-sectional view of the clamp shown in FIG. 1.

FIG. 4 is a perspective view showing two furniture supporting beams and bases joined together by transverse ganging bars to form two lines of chairs in back-to-back relationship to each other.

FIG. 5 is a fragmentary perspective view of two furniture supporting beams in end-to-end alignment with each other and connected by a common clamp.

DESCRIPTION OF THE PREFERRED EMBODIMENTS

Figure 6:
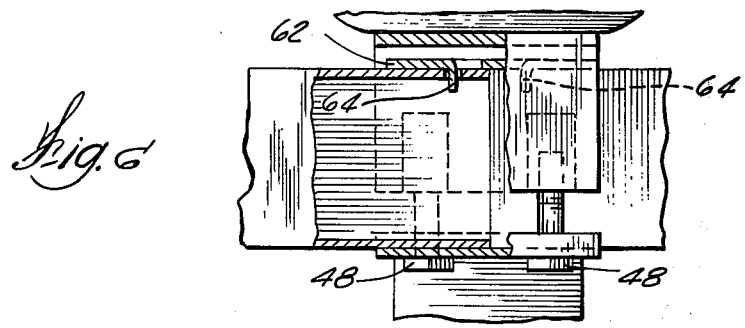
FIG. 6 is an enlarged side view, partially cut away, of the aligned beam ends shown in FIG. 5 and the means for supporting the same.

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

FIG. 1 shows one end of a furniture supporting beam 10 which is supported by a base 12 having conventional lower foot portions 14 and an upper channel member or yoke 16. It will be understood that an additional base 12, not shown, is mounted on the other end of beam 10 to thereby support both ends of the beam. Since the two bases 12 are alike in every detail, only one base 12 will be described here.

Yoke 16 is shaped to embrace the rear face or surface 18, bottom face 20 and front face or surface 22 of beam 10. Yoke 16 has a bottom plate or web 24, a front plate 26 and a rear plate 28. Two bosses or cylinders 30 having threaded bores 32 are fixed to rear plate 28 and two similar bosses 34 having threaded bores 36 are fixed to front plate 26. The inner surfaces 31, 33 of cylinders 30 and 34 taper or converge inwardly toward the web 24 which tends to pinch or securely grip the rear surface 18 and front surface 22 of the beam 10 when the beam is wedged into the yoke or channel member 16 by machine screws 38, which thread into bores 32 and 36 and engage a conventional prior art spider or clamping plate 40 which is provided with apertures 39 for receiving the screws. Thus the bosses provide a four point contact which secures the beam against displacement. The spider 40 is attached to a conventional seat and back shell 42 by bolts 43. Yoke 16 is rigidly attached to base 12 by conventional means. e.g. by welding.

As best shown in FIG. 2, the machine screws 38 which secure spider 40 to yoke 16 are situated behind the rear face 18 of beam 10 and in front of the front face 22 of beam 10. This obviates the requirement of drilling holes in the beam 10 and thus provides for a relative increase in the strength of beam 10. It also makes it possible to locate the furniture elements at any position along beam 10 instead of being restricted to certain locations by pre-drilled holes.

At locations along the beam 10 where no support is required, the yoke 16 can be used without a foot portion 14 to secure a seat, table, or other furniture supporting spider to the beam 10. In applications where the beam 10 is relatively short, support will only be required at the two ends of the beam, although intermediate support may be required with longer beams.

FIG. 4 shows a modification in which two beams 10 are clamped together in spaced parallel relationship so as to form two lines of chairs in back-to-back relationship with each other. The beams 10 are clamped together by ganging bars 44 which are welded between the sides of two yokes 16. In this modification, the two yokes 16 attached to bar 44 are turned upside down and are each secured to beams 10 by a cover plate 46 and machine screws 48 which extend through openings 50 in cover plate 46. Although only one ganging bar 44 is shown in FIG. 4, it will be apparent that another bar 44 (not shown) can be located at the other end of beams 10. Also, although the seats on spiders 41 are removed in FIG. 4 to disclose the construction of ganging bar 44 and its yokes 16, it will be apparent that seat and back shells 43 are normally mounted on the spiders 41.

Figure 3:
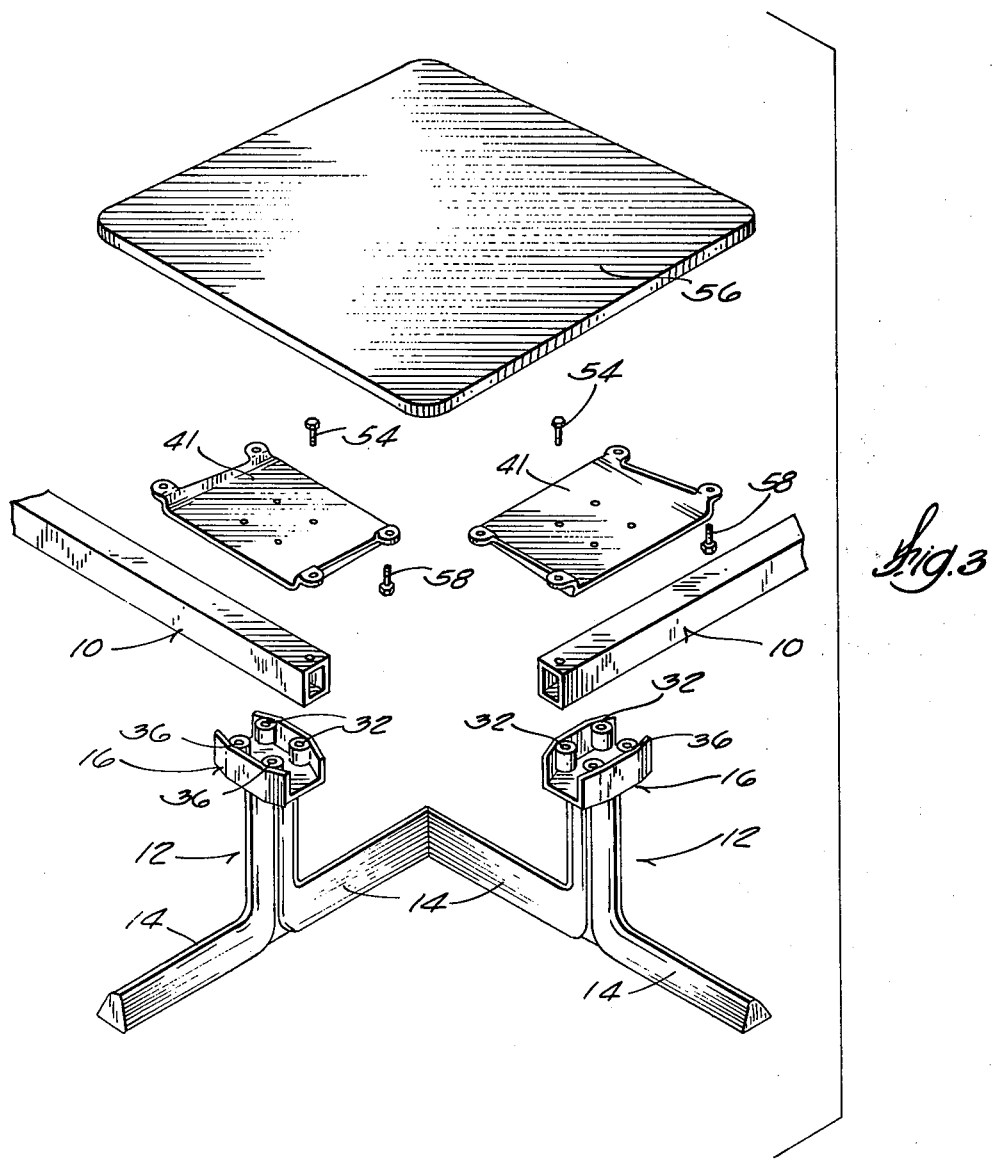
FIG. 3 is an exploded perspective view of two furniture supporting beams and bases joined to a common piece of furniture and at right angles to each other.

FIG. 3 shows how two beams 10 which extend perpendicular to each other may be used to support a common corner table 56. In this modification, the spiders 41 are attached to the threaded bores 32 and 36 of yokes 16 by means of machine screws 54. The spiders 41 are attached to the bottom of table 56 by means of machine screws 58 which engage the threaded bores (not shown) in the bottom of table 56. This construction is suitable to use in a corner where two rows of seats meet each other. There is not room enough for two seat shells 43 on the adjacent ends of beam 10, but the table 56 takes up the space very nicely and serves to cover the ends of beams 10, in addition to serving as a means for rigidly joining the ends of beams 10 together and as a means of supporting items such as ash trays and magazines.

FIGS. 5 and 6 show how the yoke 16 and its cover plate 46 may be used to support a joint between the ends of two beams 10. As best shown in FIG. 5, one end of each beam 10 has an opening 60 therein for use in joining the beam ends together. A ganging plate 62 having downwardly extending prongs 64 (FIG. 6) is positioned above the openings 60. The prongs 64 are spaced apart by a distance which corresponds to the spacing between openings 60 when the ends of beams 10 are butted together as shown in FIGS. 5 and 6. Ganging plate 62 is dimensioned to fit within yoke 16 on top of the two beams 10 across the butt joint between their ends with the prongs 64 extending through the openings 60. This locks the ends of the beams 10 together. The yoke 16 is clamped in position over the ends of the beams 10 by means of machine screws 48 which extend through openings 50 in cover plate 46, which is welded to the top of a foot portion 52.

What is claimed is:

1. In combination, a horizontally disposed support beam having a rectangular cross section and opposed parallel sides, and a clamp for fastening furniture elements to said support beam, said clamp comprising a channel member including spaced wall portions interconnected by a web, said wall portions including spaced discontinuous surfaces converging toward each other within said channel and toward said web, said converging surfaces being engageable in a friction fit with said opposed sides of said beam, threaded apertures in said channel member wall portions, said clamp including a clamping plate with openings arranged at a spacing greater than the width of said beam and bolts extending through said openings into said threaded apertures and located adjacent the sides of said beam to urge said beam between said converging surfaces against the frictional contact of said beam and said converging surfaces into abutment with said web.

2. The combination of claim 1 wherein said wall portions include bosses within said channel, said bosses having said threaded apertures.

3. The combination of claim 2 wherein there are four of said bosses and said converging surfaces are on said bosses to provide a four point contact with said beam.

4. The combination of claim 1 wherein said clamping plate comprises a spider and including one of a table top and seat shell fixed to said spider.

5. The combination of claim 1 wherein said channel member is fixed to a base and is upwardly open to receive said beam.

6. The combination of claim 1 wherein said channel member has a ganging bar fixed thereto.

7. In a modular furniture supporting structure including a horizontal beam and at least two bases each having a lower foot portion for supporting the base and having an upper yoke portion with a yoke bottom for supporting the beam, and furniture mounting spiders having bolt apertures the improvement wherein each yoke portion has threaded bosses with inwardly tapered surfaces to frictionally engage the side faces of said beam, and bolts threadably received in said bosses and located on the sides of said beam, said bolts extending through said spider apertures and securing said spider to said yoke and clamping said beam against said yoke bottom.

8. In combination, a horizontally disposed support beam having a rectangular cross section and opposed parallel sides, a furniture leg assembly and a clamp for fastening furniture elements to said support beam, said clamp being fastened to said leg assembly and comprising an upwardly open channel member including spaced wall portions interconnected by a web, said wall portions including surfaces converging toward each other within said channel and toward said web, to form a tapered throat in said channel located inwardly of said spaced wall portions, said converging surface engageable in a friction fit with said beam intermediate the depth of the channel, threaded apertures in said channel member wall portions within said channel, said clamp including a clamping plate having apertures for fastening to one of a seat and table and with openings arranged at a spacing greater than the width of said beam and bolts extending through said openings into said threaded apertures and located adjacent the sides of said beam to secure said beams in said channel member.

9. The combination of claim 1 wherein said wall portions include bosses within said channel, said bosses having said converging surfaces forming said tapered throat.

* * * * *